United States Patent [19]

Yoshida et al.

[11] Patent Number: 5,726,960
[45] Date of Patent: Mar. 10, 1998

[54] DISC PLAYER HAVING DISC CHANGING FUNCTION

[75] Inventors: Masanao Yoshida; Masao Horiuchi, both of Higashiosaka, Japan

[73] Assignee: Sanyo Electric Co., Ltd., Moriguchi, Japan

[21] Appl. No.: 745,634

[22] Filed: Nov. 8, 1996

Related U.S. Application Data

[63] Continuation of Ser. No. 512,075, Aug. 7, 1995, abandoned, which is a continuation of Ser. No. 158,447, Nov. 29, 1993, abandoned.

[30] Foreign Application Priority Data

Nov. 30, 1992 [JP] Japan ................. 4-320388

[51] Int. Cl.⁶ .................. G11B 17/22; G11B 27/10
[52] U.S. Cl. .................. 369/34; 369/37
[58] Field of Search .................. 369/34, 33, 36, 369/30, 37, 38, 39, 35, 178, 179, 191, 192, 193

[56] References Cited

U.S. PATENT DOCUMENTS

| | | | |
|---|---|---|---|
| 4,766,581 | 8/1988 | Korn et al. | 369/34 |
| 5,191,573 | 3/1993 | Hair | 369/33 |
| 5,228,015 | 7/1993 | Arbiter | 369/34 |

FOREIGN PATENT DOCUMENTS

| | | |
|---|---|---|
| 0 265 167 | 4/1988 | European Pat. Off. |
| 3276483 | 12/1991 | Japan . |
| 2 210 724 | 6/1989 | United Kingdom . |
| 2 240 869 | 8/1991 | United Kingdom . |
| WO 86/01326 | 2/1986 | WIPO . |

*Primary Examiner*—Robert S. Tupper
*Assistant Examiner*—David L. Ometz
*Attorney, Agent, or Firm*—Armstrong, Westerman, Hattori, McLeland & Naughton

[57] ABSTRACT

A disc player adapted to selectively play a plurality of discs 8 accommodated in a disc holder 7 comprises a memory 1 for storing a category name for each of disc storage portions of the holder 7, an operation key group 24 to be manipulated for specifying the category name of the discs to be played, and a system control circuit 4 for retrieving from the memory 1 the category name specified by manipulating the key group and automatically playing a plurality of discs in the disc storage portions given the category name.

6 Claims, 11 Drawing Sheets

DISC PLAYER HAVING DISC CHANGING FUNCTION

This application is a continuation of application Ser. No. 08/512.075 filed Aug. 7, 1995, now abandoned, which is a continuation of application Ser. No. 08/158.447 filed Nov. 29, 1993, now abandoned.

FIELD OF THE INVENTION

The present invention relates to a disc player wherein disclike recording media (hereinafter referred to as "discs") having various items of data recorded therein are accommodated in a plurality of disc storage portions and which is adapted to selectively play desired discs.

BACKGROUND OF THE INVENTION

Compact discs (CDs) having audio signals digitally recorded thereon and CD players are already in wide use. In recent years, CD players have been developed which have a disc changing function and which are adapted to selectively play a plurality of discs accommodated in the player.

For example, Examined Japanese Patent Publication HEI 4-19626 discloses a CD player which is adapted to select desired CDs from among a plurality of CDs accommodated in the body of the player, select desired pieces of music recorded on the selected CDs and automatically play the selected pieces. For this purpose, the desired CD numbers and the music piece numbers in the desired CDs are registered in a memory by manipulating input keys in advance for the player to automatically give a CD music performance based on the data stored in the memory.

Unexamined Japanese Patent Publication HEI 4-245085 proposes another CD player for use with a plurality of magazines each accommodating a plurality of CDs, one of the magazines being replaceably set in the body of the player. The magazines prepared for the CD player in advance are each given a name, which is registered in a memory. The CDs accommodated in each magazine are also each given a name, which is also registered in the memory. Accordingly, the data as to a particular disc which becomes lost or damaged after the registration can be erased from the memory without the necessity of setting the disc in the player body.

With the conventional CD players having a disc changing function, the plurality of CDs must each be given a name for identifying the CD as distinguished from the other CDs, and the names of a desired number of CDs need to be specified before automatic playing. Thus, the CD players have the problem of being very cumbersome to operate.

Especially with CD players which handle a multiplicity of CDs, the music recorded therein falls under different categories (such as, classical music, jazz and rock. However, in the event that user desires a particular category from among the different categories, (e.g., rock only) for automatic playing, it is necessary with the conventional CD player, to input and register the names of all CDs included in the desired category hence, a cumbersome procedure ensures.

SUMMARY OF THE INVENTION

An object of the present invention is to provide a disc player which automatically plays a plurality of discs included in a particular category optionally selected by the user from among the discs to be played by the player. The plurality of discs can be automatically played merely by specifying the desired category without the necessity of specifying the names of the discs.

The present invention provides a disc player which has a disc changing function and which comprises memory means for storing a category name for each of disc storage portions, category specifying means to be manipulated for specifying the category name of the discs to be played, and automatic reproduction means for retrieving from the memory means the category name specified by manipulating the category specifying means and successively automatically playing a plurality of discs in the disc storage portions given the category name.

More specifically, the disc player has a display, and category display means for displaying the category name of each of the disc storage portions on the display.

The disc player further comprises category input means to be manipulated when a new category name is to be registered in the memory means, and category registration means for registering the category name in the memory means in accordance with the manipulation of the category input means.

When a particular category name is specified by manipulating the category specifying means to execute automatic reproduction, the category display means successively shows on the display all category names stored in the memory means and given to the disc storage portions containing the discs which can be played.

With the disc player embodying the present invention, the category input means is manipulated when discs are accommodated in the plurality of disc storage portions to input a category name for each of the disc storage portions. In accordance with this operation, the category registration means registers the category name of each storage portion in the memory means. Category names are not limited to those of music such as classical music, jazz and rock but can be desired names insofar as these names represent the categories of what is recorded in the discs.

When discs are to be automatically played thereafter, the category specifying means is manipulated to specify the category name of the discs to be played. In accordance with this, the automatic reproduction means retrieves the specified category name from the memory means and recognizes the disc storage portions which are given the specified category name. The reproduction means then prepares a control signal for automatically playing the discs in these storage portions in a predetermined order and feeds the signal to a control circuit of the disc player.

Consequently, the discs included in the specified category are played in succession for reproduction. The order in which the disc are played can be the order of discs as arranged in the disc storage portions, a random order or various other orders that can be predetermined.

The disc player having a disc changing function and embodying the present invention automatically plays the discs in a particular category as selected from among a plurality of discs accommodated in the player, merely when the category is specified as desired. The player is therefore easier to use than the conventional disc player in the case where disc names need to be individually specified.

DETAILED DESCRIPTION OF EMBODIMENT

With reference to the drawings, a detailed description will be given of an embodiment of the invention, i.e., a disc player having a disc changing function for 24 discs.

Figure 1:
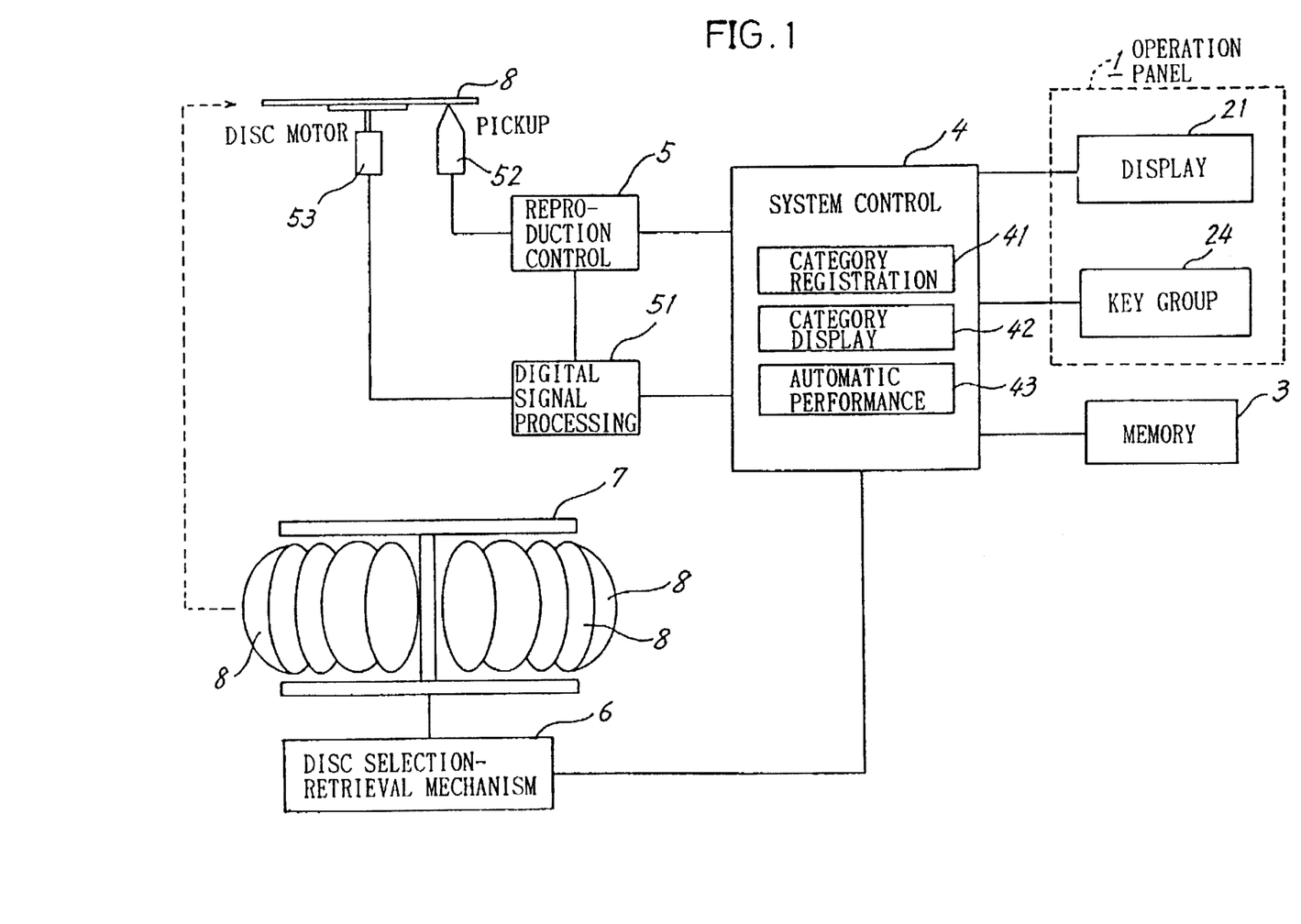
FIG. 1 is a block diagram showing the construction of a disc player embodying the invention.

FIG. 1 shows the construction of the disc player. A disc holder 7 has accommodated therein 24 CDs 8, from which one CD 8 is selected and withdrawn by a disc selection-retrieval mechanism 6. The disc is transported to a playing mechanism comprising a pickup 52 for reproducing signals, a disc motor 53 for drivingly rotating the CD 8, etc.

The interior of the disc holder 7 is partitioned into 24 disc storage portions, to which the consecutive numbers "1" to "24" are assigned, respectively. The disc is identified with reference to the number.

The pickup 52 has connected thereto a reproduction control circuit 5 for controlling the tracking movement and focusing movement of the pickup 52. A digital signal available from the pickup 52 via the circuit 5 is fed to a digital signal processing circuit 51, thereby processed for demodulation, error correction, D/A conversion, etc. and fed to a subsequent circuit (not shown) comprising, for example, an amplifier. Part of the signal available from the processing circuit 51 is fed to the disc motor 53 to control the rotation of the CD.

A system control circuit 4 comprising a microcomputer is connected to the reproduction control circuit 5 and the digital signal processing circuit 51. Connected to the control circuit 4 are an operation panel 1 having arranged thereon a group of operation keys 24 and a liquid crystal display 21, and a memory 3 for storing data as to categories.

The system control circuit 4 executes an overall system control operation for the CD player including setting operation modes, and a control operation concerning categories relating to the invention. For the latter control operation, the circuit 4 has category registration means 41, category display means 42 and automatic performance means 43 which are provided by the computer program to be described later.

The category registration means 41 executes a procesure for registering category names in the memory 3 in accordance with the manipulation of the operation key group 24. The automatic performance means 43 retrieves a particular category name specified by manipulating the key group 24 from the memory 3 and executes a procedure for automatically playing in a predetermined order the discs in the storage portions which are given the category name. The category display means 42 executes a procedure for showing the category name of each disc storage portion on the display 2. These procedures will be described in detail later.

Figure 10:
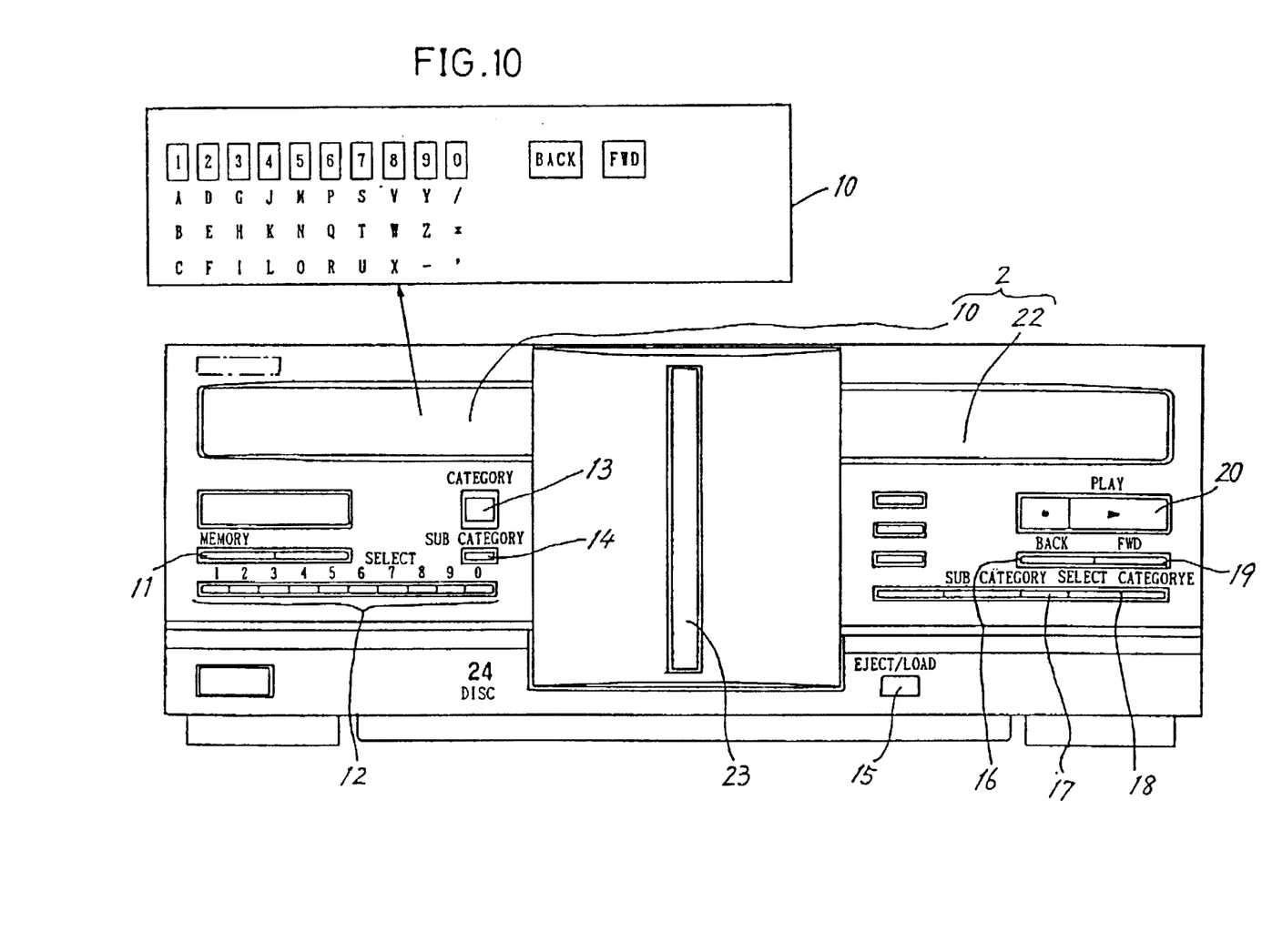
FIG. 10 is a front view showing an arrangement on a front panel.

FIG. 10 shows the construction of the operation panel 1. The display 2 comprises a first display portion 10 and a second display portion 22. The operation key group 24 includes MEMORY key 11, SELECT keys 12, CATEGORY key 13, SUBCATEGORY key 14, EJECT/LOAD key 15, BACK key 16, SELECT SUBCATEGORY key 17, SELECT CATEGORY key 18, FWD key 19 and PLAY key 20.

Figure 2:
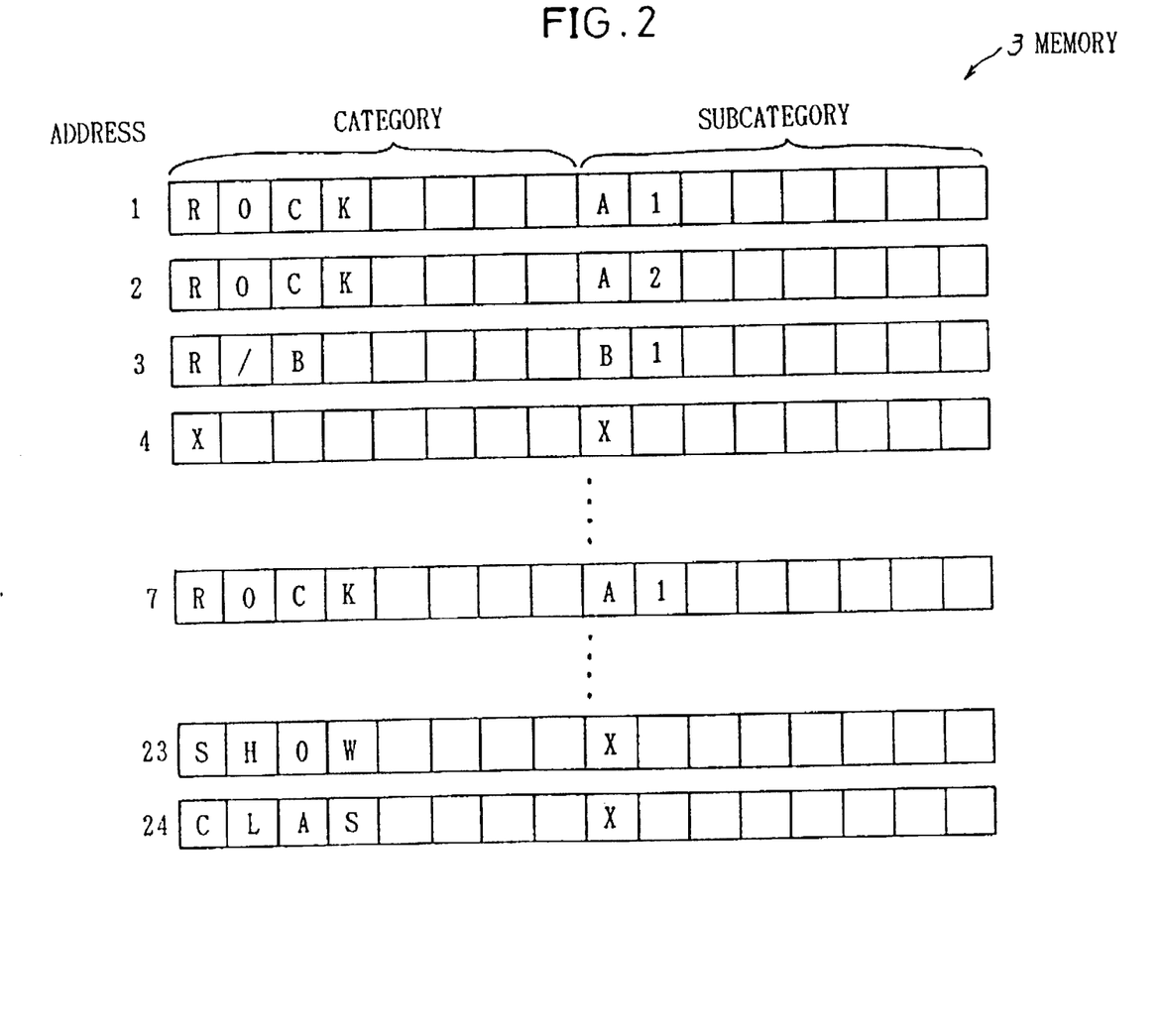
FIG. 2 is a diagram showing the structure of data in a memory.

FIG. 2 shows a data structure in the memory 3. An 8-byte category registration portion and an 8-byte subcategory registration portion are provided for each of the 24 disc storage portions. The addresses "1" to "24" are given to the storage portions, respectively. A root category name (hereinafter referred to merely as the "category name") for a particular category such as rock, classical music or jazz is registered in the category registration portion. A subcategory name (such as the name of a singer or various symbols or the like) which can be optionally determined by the user is registered in the subcategory registration portion. Such category names and subcategory names are provided a hierarchial category structure.

Although a name or the like is optionally registered in the subcategory registration portion, one of the seven standard category names predetermined by the manufacturer can be selectively registered in the category registration portion. When required, an optional category name determined by the user as desired can also be registered in this portion. The seven standard category names are shown on the display in a predetermined order when the category names are registered as will be described later.

Thus, category names and subcategory names can be registered in the memory 3 for all the 24 disc storage portions. However, for the disck storage portion having no discs accommodated therein, specific data "X" indicating that no category or subcategory is given is written to the address corresponding to the storage portion- The category name only can be given with no subcategory name provided. In this case the data "X" is written to the subcategory registration portion.

Figure 3:
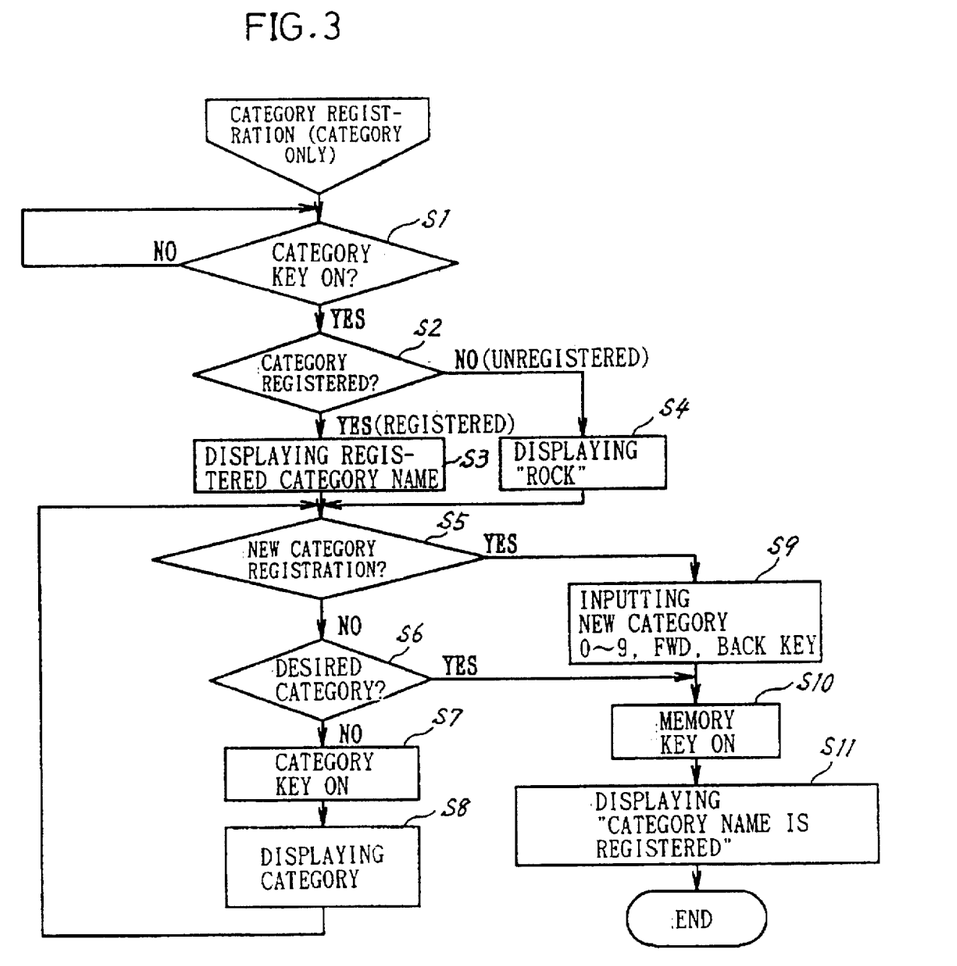
FIG. 3 is a flow chart showing a procedure for registering category names only.

FIGS. 3 to 9 each show the control procedure to be executed by the system control circuit 4 in connection with categories for the circuit to perform a particular function. FIG. 3 shows the procedure for registering the category name only, FIG. 4 and FIG. 5 the procedure for registering both the category name and the subcategory name, FIG. 6 a category selection procedure for automatic playing based on the category name only, FIG. 7 a category selection procedure for automatic playing based on both the category name and the subcategory name, FIG. 8 an automatic playing procedure, and FIG. 9 an example of automatic performance.

For the registration of the category, EJECT/LOAD key 15 shown in FIG. 10 is first depressed, whereupon the second display portion 22 shows "LOAD DISC," urging the user to load a CD. In response to this, the user loads the CD into a specified disk storage portion through a CD inlet 23. The second display 22 then shows "(disc storage portion No.) PROGRAM CATEGORY," demanding registration of the category, whereupon CATEGORY key 13 is pushed.

With reference to FIG. 3, CATEGORY key is checked as to whether it has been pushed in step S1. If it has been pushed, step S2 inquires whether the category has been registered for the storage portion concerned. When the answer is affirmative, the category name already registered is displayed in step S3. Otherwise, the first standard category name "ROCK" is displayed in step S4.

Next, in step S5, an inquiry is made as to whether a new category name is to be registered, cancelling the displayed category name. If the answer is affirmative, the new category name (desired category name) is input by SELECT key, FWD key and BACK key in step S9. MEMORY key is thereafter pushed in step S10, whereby the new category name is registered. Subsequently, a scroll shows that the category name has been registered in step S11.

On the other hand, if step S5 finds that no new category name is to be registered, step S6 asks the user whether the category name displayed is the desired one. When the answer is affirmative, the sequence proceeds to step S10, in which the name is registered in the memory. Otherwise, step S7 confirms that CATEGORY key has been depressed, followed by step S8, in which the next standard category is displayed. The sequence then returns to step S5. Steps S5 to S8 are repeated until the desired standard categories are displayed. After the last standard category has been displayed, the sequence returns to the first standard category "ROCK." When the desired catagory is shown in this process, step S10 subsequently registers the category in the memory.

Figure 4:
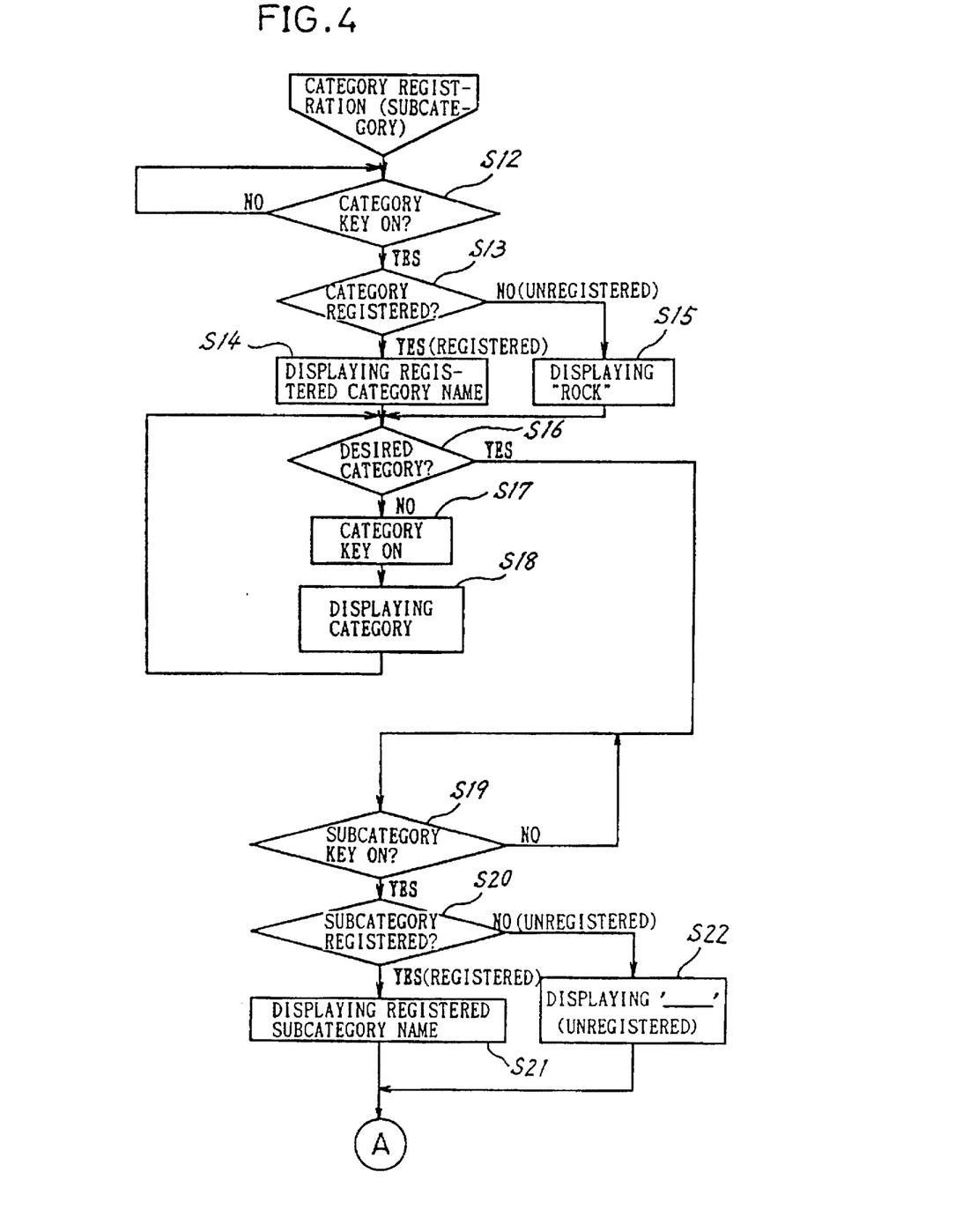
FIG. 4 is a flow chart showing the first half of a procedure for registering category names and subcategory names.

In registering the category name and subcategory name as shown in FIG. 4, the category registration steps S12 to S18 which are the same as steps S1 to S8 of FIG. 3 are executed. When the category name shown on the display in step S16 is the desired one in this process, the procedure for registering the subcategory follows.

In this procedure, step S19 first inquires whether SUBCATEGORY key has been depressed. After the key has been depressed, an inquiry is made in step S20 as to whether a subcategory has been registered in the subcategory registration portion concerned. If the answer is affirmative, the registered subcategory name is shown in step S21. Otherwise, step S22 shows that no registration has been made.

Figure 5:
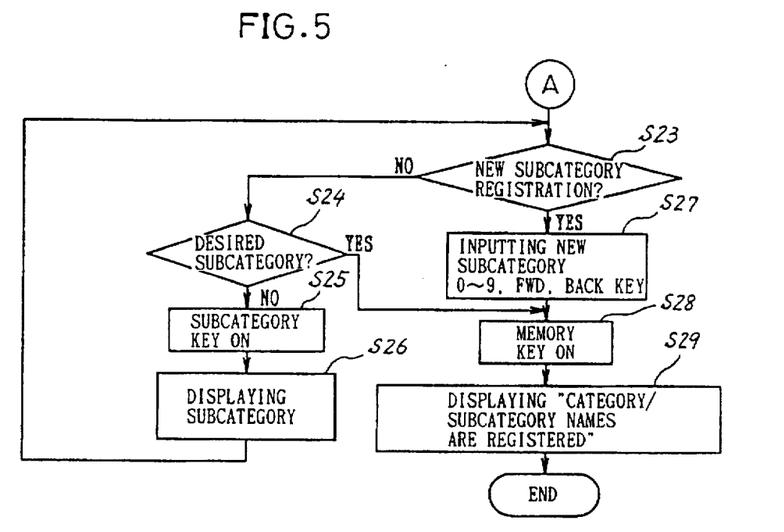
FIG. 5 is a flow chart showing the second half of the same procedure.

Next in step S23 of FIG. 5, an inquiry is made as to whether a new subcategory name is to be registered, cancelling the displayed subcategory name. When the answer is in the affirmative, the new name is input by SELECT key, FWD key and BACK key in step S27, and step S28 confirms that MEMORY key has been pushed. This results in the registration of the new subcategory name in the memory. Subsequently in step S29, the scroll shows that the category name and subcategory name have been registered.

On the other hand, if the answer to the inquiry of step S23 is negative, step S24 asks the user whether the subcategory name displayed is the desired one. When the answer is affirmative, the sequence proceeds to step S28 to register the subcategory name in the memory. When the answer is negative, depression of SUBCATEGORY key is confirmed in step S25, step S26 then displays the next subcategory name already registered, and the sequence returns to step S23. Steps S23 to S26 are then repeated until the desired subcategory names are displayed. After the last subcategory name registered has been displayed, the display urges the user to input a new subcategory. When the desired subcategory is displayed in this process, step S28 subsequently registers the subcategory in the memory.

The above category registration procedure is executed for all the 24 disc storage portions, whereupon the sequence returns to the main routine of the system control circuit 4, which waits for a command to set, for example, PLAY mode.

The procedure for inputting with keys the new category or subcategory name is executed using SELECT keys 12 of "1" to "9", FWD key 19 and BACK key 16 shown in FIG. 10 as already stated. At this time, characters are picked up using these keys from the alphabet shown in the first display portion 10 to form the desired name. The name thus formed is shown on the second display portion 22 of the display 2. FIG. 10 partly shows the first display portion 10 on an enlarged scale.

To pick up the character from the alphabet, the position of character is determined by FWD key 19 and BACK key 16 first, and SELECT key 12 ("1" to "9") is depressed to specify a group of three characters arranged in a vertical row. For example, when "Q" is to be selected, SELECT key 12, "6" is pushed once, whereby "P" is selected. The key "6" is pushed once again to select "Q". By pushing BACK key 16 or FWD key 19, the character in the position is fixed. The row of characters selected is determined as a category by pushing CATEGORY key 13, SUBCATEGORY key 14 or PLAY key 20.

Figure 11:
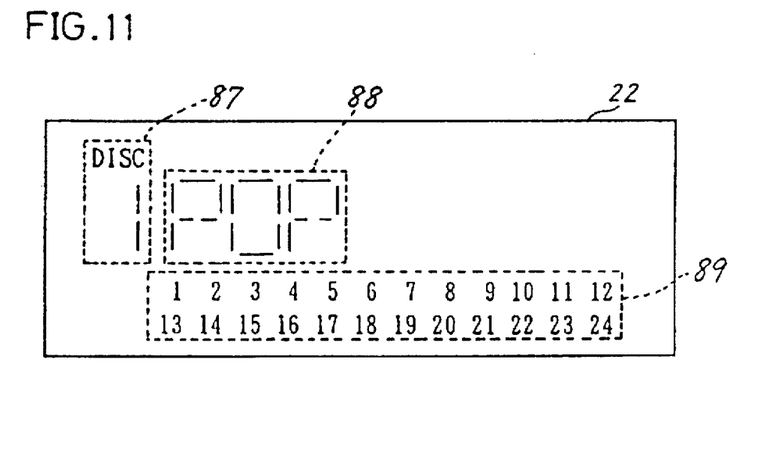
FIG. 11 is a diagram showing an example of category name displayed for category registration.
Figure 12:
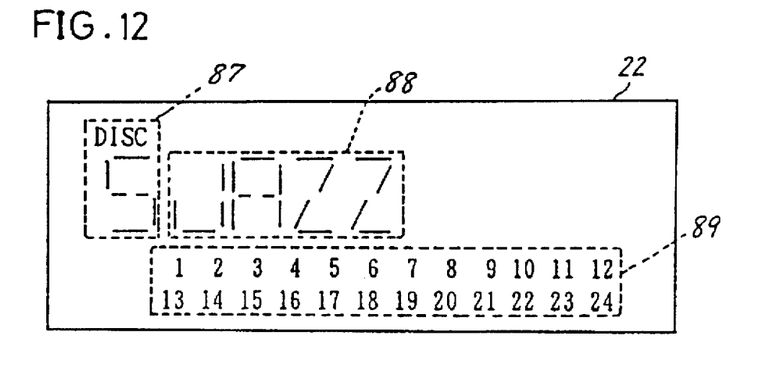
FIG. 12 is a diagram showing another example of category name displayed.
Figure 13:
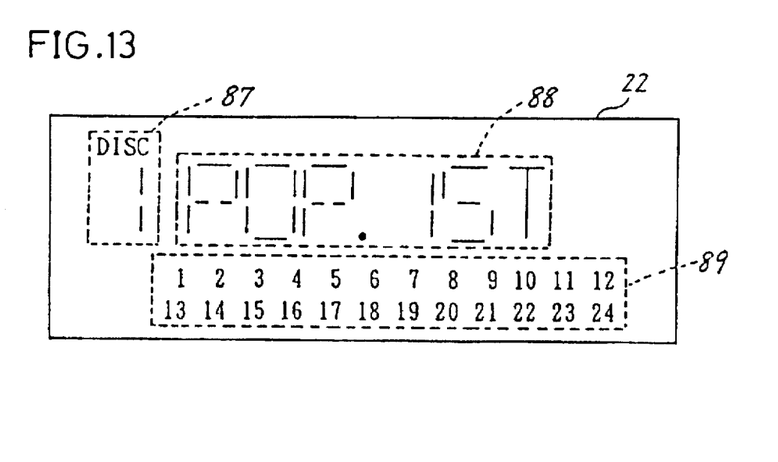
FIG. 13 is a diagram showing examples of category name and subcategory name displayed.
Figure 14:
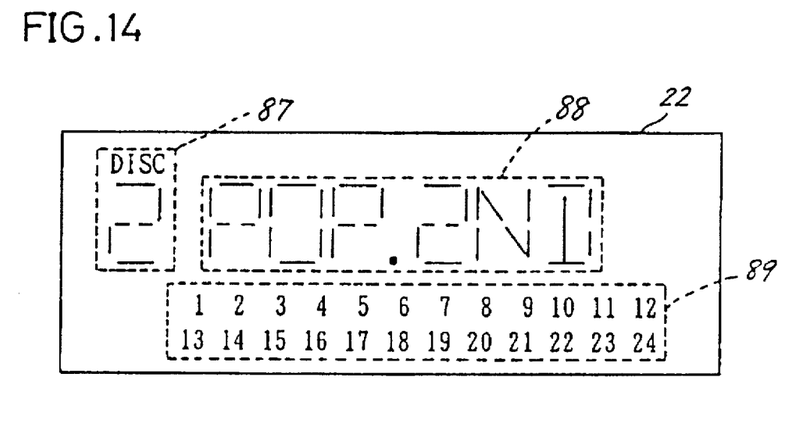
FIG. 14 is a diagram showing other examples of category name and subcategory name displayed.

FIGS. 11 to 14 show examples shown on the second display portion 22 for registration. FIGS. 11 and 12 show examples of category names only. "DISK 1" indicated at 87 shows a disc storage portion number. "POP" and "JAZZ" indicated at 88 show categories. "1" to "24", indicated at 89, are the numbers of the storage portions. FIGS. 13 and 14 show examples displayed for the registration of subcategories. The subcategory names "1ST" and "2ND" are added to category indications 88.

Figure 6:
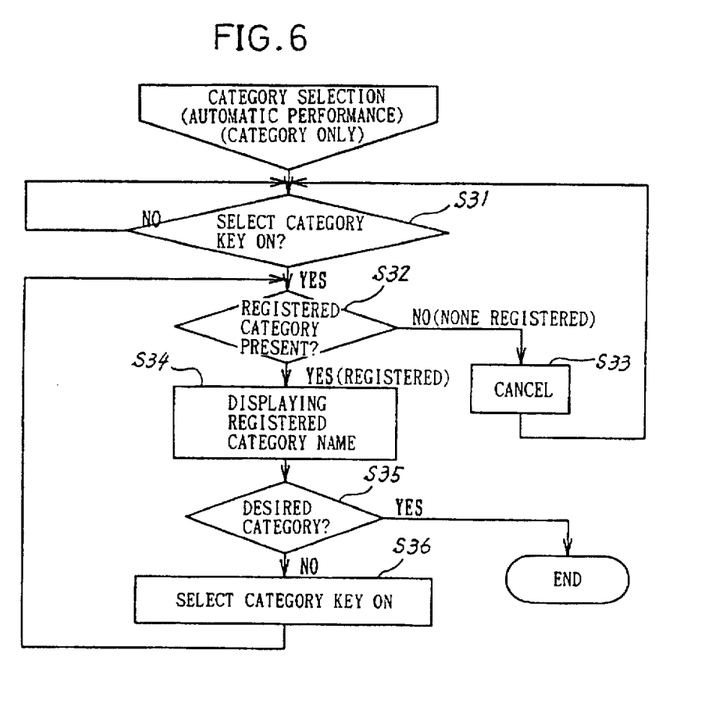
FIG. 6 is a flow chart showing a category selection procedure for automatic playing based on the category name only.

With reference to FIG. 6 which shows a category selection procedure for automatic playing or performance, step S31 first inquires whether SELECT CATEGORY key has been depressed. If the answer is affirmative, the memory is searched for a registered category in step S32. When the category has been registered, the name of category registered is displayed along with the storage portion number in step S34. Next, an inquiry is made as to whether the displayed category name is the one desired by the user. If the answer is negative, depression of SELECT CATEGORY key is confirmed in step S36, and the sequence thereafter returns to step S32. Steps S32 to S36 are repeated for all the categories registered to display all categories. Step S32 confirms that no registered category remains, whereupon the category selection state is cancelled in step S33. The sequence then proceeds to step S31 to wait for the subsequent depression of SELECT CATEGORY key. When the desired category is displayed in step S35 in this process, the procedure is completed.

Through the execution of the above procedure, the display shows all the category names registered and the numbers of storage portions which are given the category names. At this time, the subcategory is disregarded.

Figure 15:
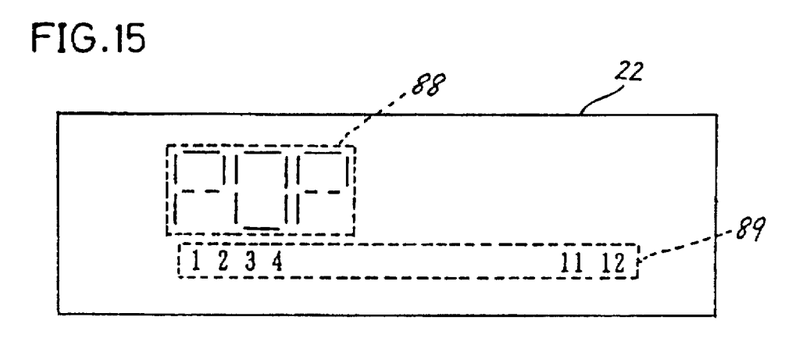
FIG. 15 is a diagram showing a display example indicating a particular category of automatic performance.
Figure 16:
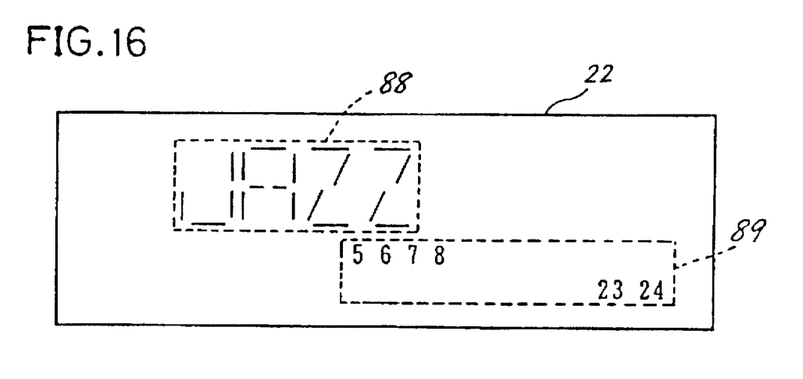
FIG. 16 is a diagram showing another display example for another category.

FIGS. 15 and 16 show examples of categories shown on the display. The example of FIG. 15 indicates that the category name "POP" is given to the disc storage portions Nos. "1" to "4", "11" and "12". The example of FIG. 16 shows that the category name "JAZZ" is given to the storage portions Nos. "5" to "8", "23" and "24".

Figure 7:
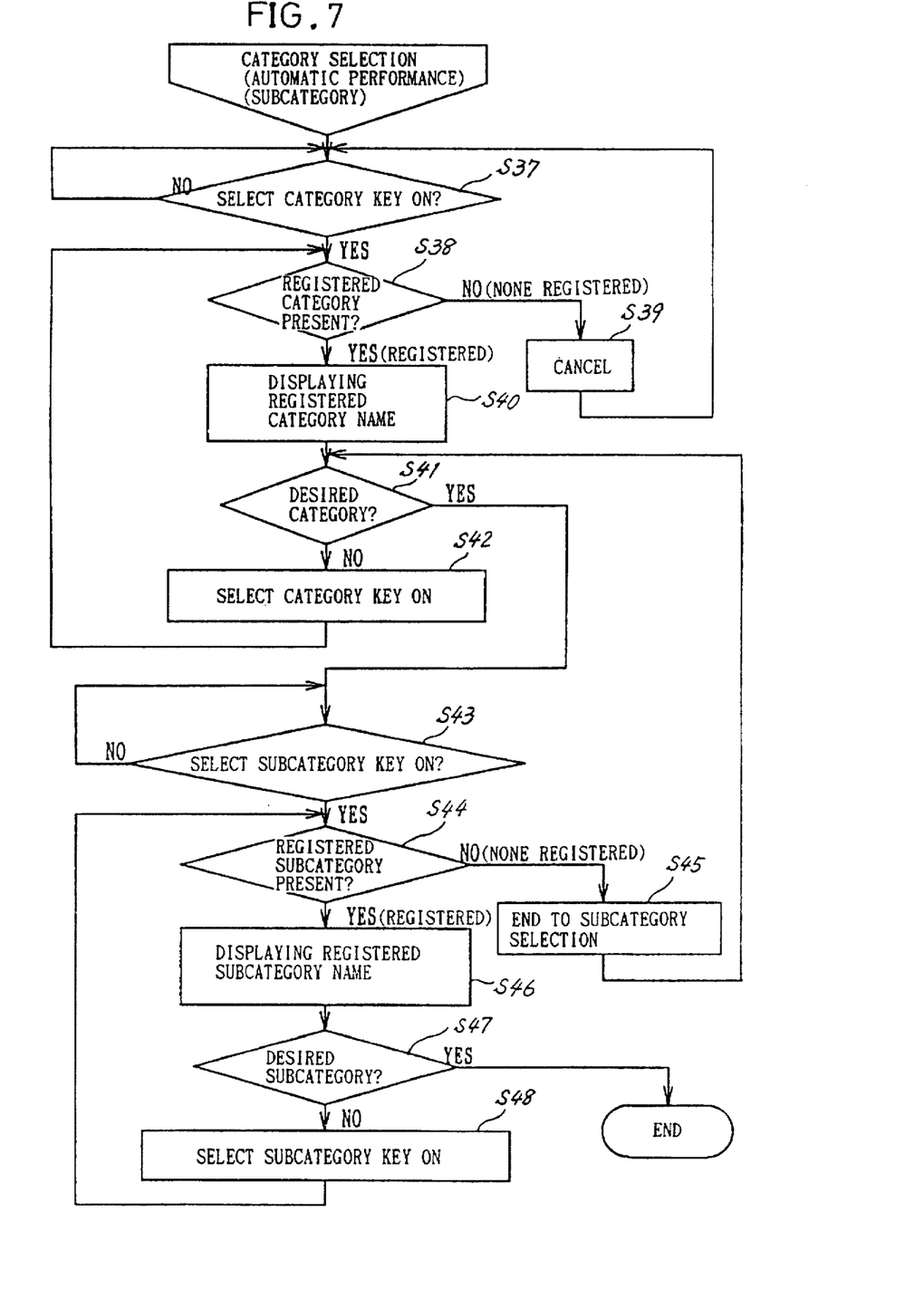
FIG. 7 is a flow chart showing a category selection procedure for automatic playing based on the category name and subcategory name.

In the category and subcategory selection for automatic playing shown in FIG. 7, a category selection procedure S37 to S42 is executed first like steps S31 to S36 of FIG. 6. When the desired category is shown in step S41 in this process, a subcategory selection procedure follows. More specifically, step S43 inquires whether SELECT SUBCATEGORY key has been depressed. If the answer is affirmative, step S44 inquires whether there is any registered subcategory by searching the memory. When the answer is affirmative, the registered subcategory name is displayed along with the category name and disc storage portion number in step S46. Next step S47 asks the user whether the displayed subcategory name is the desired one. If the answer is negative, step S48 confirms that SELECT SUBCATEGORY key has been pushed, and the sequence returns to step S44. The foregoing steps S44 to S48 are repeated for all subcategories, all subcategories are displayed, and step S44 confirms that any registered subcategory no longer remains, whereupon the subcategory selecting state is cancelled in step S45. The sequence returns to step S41 to execute category selection again. When the desired subcategory is displayed in step S47 during this process, the procedure is terminated.

Figure 8:
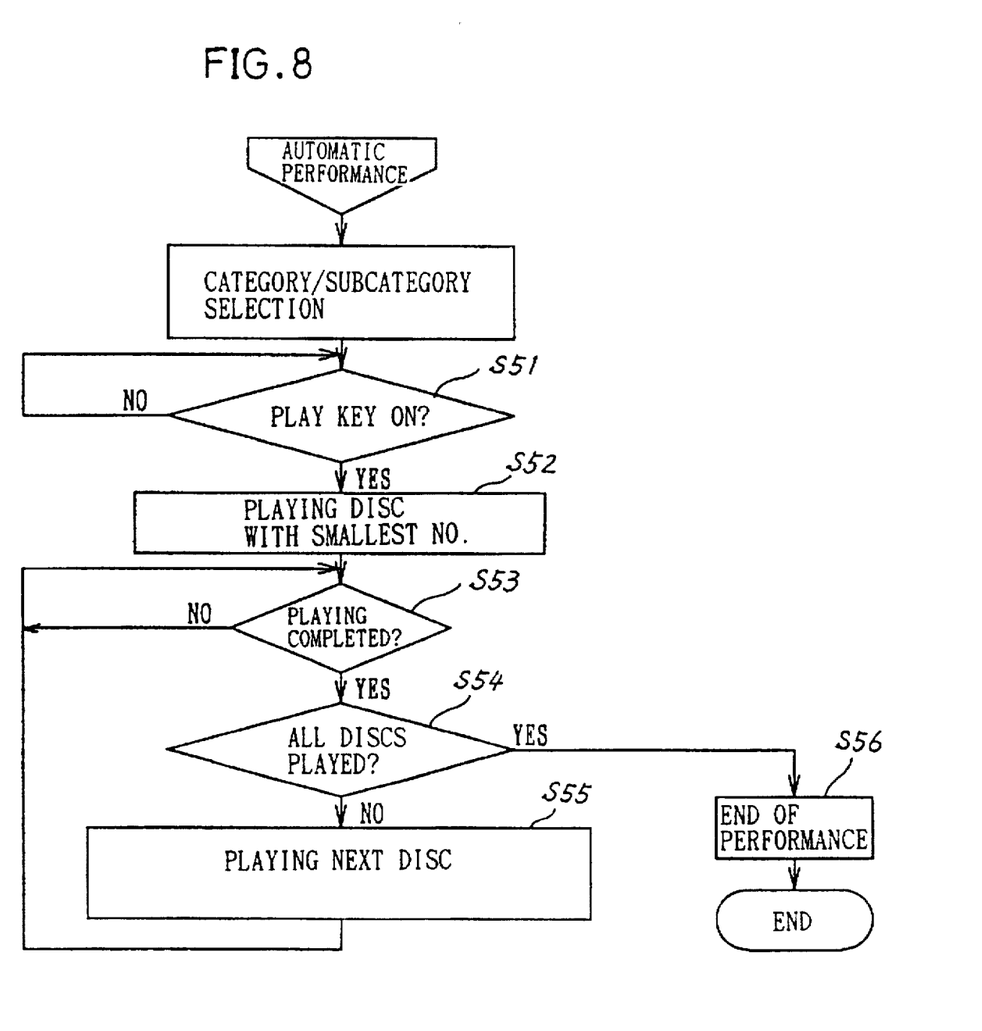
FIG. 8 is a flow chart showing an automatic playing procedure.

FIG. 8 shows an automatic performance procedure, in which the foregoing category/subcategory selection procedure is executed first to show the desired category name/subcategory name on the display. An inquiry is then made as to whether PLAY key 20 has been depressed in step S51. When the answer is affirmative, the player first plays the discs in the storage portion of the smallest of the numbers of the storages having the category name/subcategory name shown (step S52). Termination of performance is thereafter detected in step S53, followed by step S54 which inquires whether the discs in all the storage portions with the category name/subcategory name concerned have been completely played. If the answer is negative, the discs in the storage portion with the next larger number are played, followed by step S53. When step S54 confirms completion of the discs in all storage portions during this process, the performance is discontinued in step S56 to complete the procedure.

When the category name is specified, all discs falling under the category of that name are played regardless of whether the subcategories are the same or different. Further, when both the category name and subcategory name are specified, only the CDs falling under the category and subcategory concerned are played.

Figure 9:
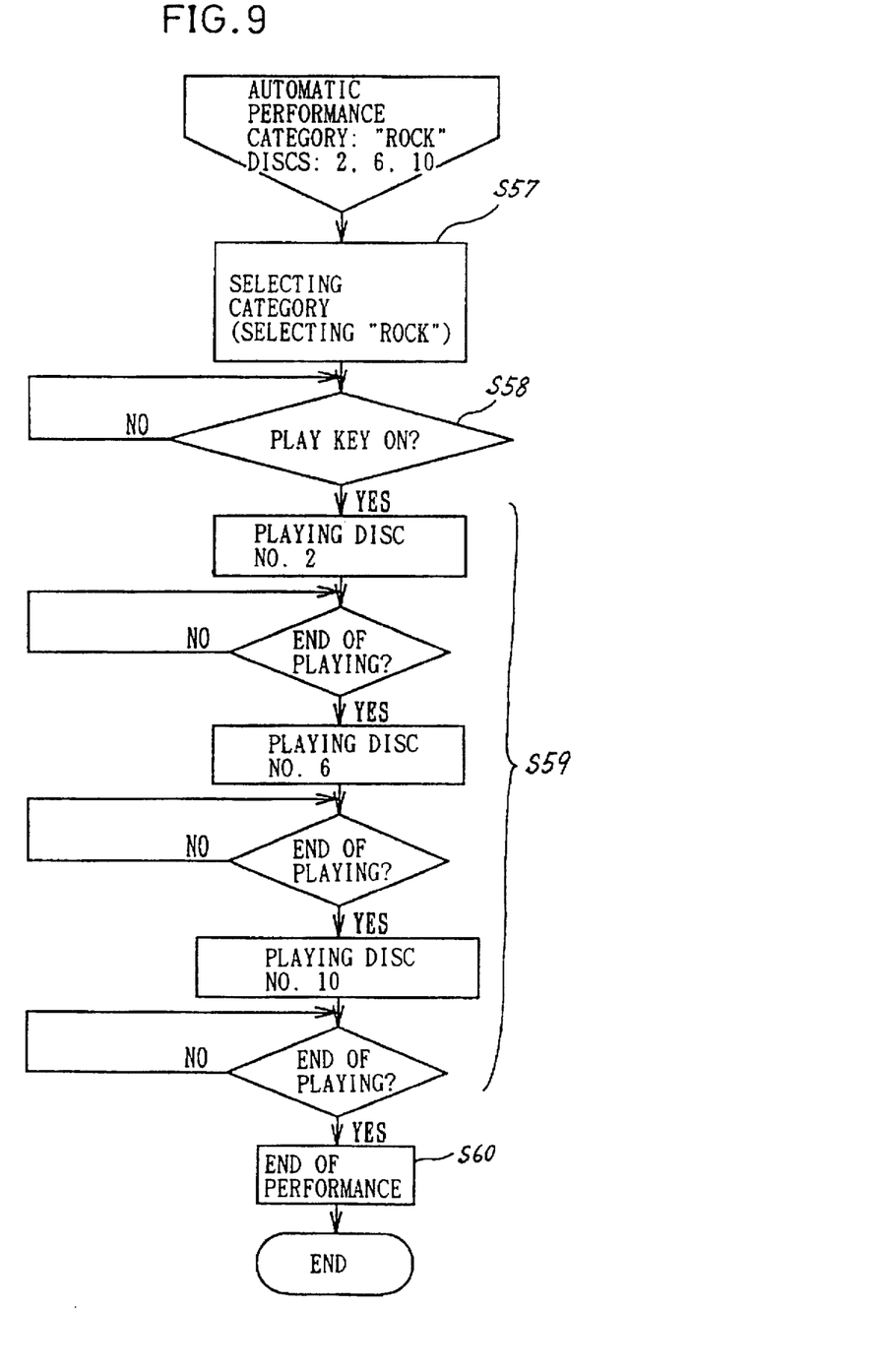
FIG. 9 is a flow chart showing an example of automatic performance.

FIG. 9 shows an example of automatic performance when the category name "ROCK" is given to the storage portions Nos. "2", "6" and "10". First in step S57, the category name "ROCK" is selected by the foregoing category selection procedure, followed by step S58, which inquires whether PLAY key has been pushed. When the key has been depressed, step S59 follows, in which the discs accommodated in the storage portions Nos. "2", "6" and "10" are played in succession. The performance is thereafter terminated in step S60.

With the disc player embodying the present invention described, disks are automatically played merely by specifying the category concerned and, when required, the subcategory concerned. Accordingly, the names of the individual discs need not be specified, and the player is extremely easy to use.

Further, when category names are registered, standard category names are first displayed in succession, so that a particular category name, when to be selected from among these names, can be input by an easy procedure.

Further in specifying the category name for automatic playing, the category names registered in the memory are succeissively shown on the display. The category name is therefore easy to specify.

The above embodiment has been described to illustrate the present invention and should not be interpreted as limiting the present invention as defined in the appended claims or reducing the scope thereof. The device of the invention is not limited to the foregoing embodiment in construction but can be modified variously by one skilled in the art without departing from the spirit of the invention as set forth in the claims.

For example, the invention is not limited to CD players but can of fource embodied as disc players of any type for use with disclike recording media.

What is claimed is:

1. A disc player for selectively playing a plurality of discs accommodated in a plurality of disc storage portions, the disc player comprising:

A. memory means for storing a category name for each of the disc storage portions;

B. category specifying means to be manipulated for specifying the category name of the discs to be played, the category specifying means providing an initiation step for providing a sequence of individual discs belonging to the specified category name of the discs; and C. automatic reproduction means operably coupled to the category specifying means having:

a. a first retrieving means for retrieving from the memory means the category name specified by manipulating the category specifying means, b. a second retrieving means for successively retrieving the plurality of discs from the disc storage portions directly based on the initiation step, and c. a means for successively automatically playing the plurality of discs in the disc storage portions given the category name directly based on the initiation step without a need for any intervening acts to be performed by a user.

2. A disc player as defined in claim 1 which further comprises a display, and category display means for displaying the category name of each disc storage portion on the display.

3. A disc player as defined in claim 2 which further comprises category input means to be manipulated when a new category name is to be registered in the memory means, and category registration means for registering the new category name in the memory means in accordance with the manipulation of the category input means.

4. A disc player as defined in claim 3 wherein when one of the category names is specified by manipulating the category specifying means to execute automatic reproduction, the category display means successively shows on the display all category names stored in the memory means and given to the disc storage portions containing the discs which can be played.

5. A disc player as defined in claim 3 wherein the category names include a plurality of standard category names prepared in advance and an optional category name optionally determinable by the user, and when the category names are input, the category registration means first registers the standard category name selected by the manipulation of the category input means in the memory means while successively showing the plurality of standard category names on the display and thereafter registers the optional category name input by manipulating the category input means in the memory means.

6. A disc player as defined claim 1 wherein the category names have a hierarchical structure wherein root category names provide the first stratum, and subcategory names provide the second stratum.

* * * * *